G. A. LYON.
BUFFER ATTACHING DEVICE.
APPLICATION FILED JULY 6, 1922.
1,437,600.
Patented Dec. 5, 1922.
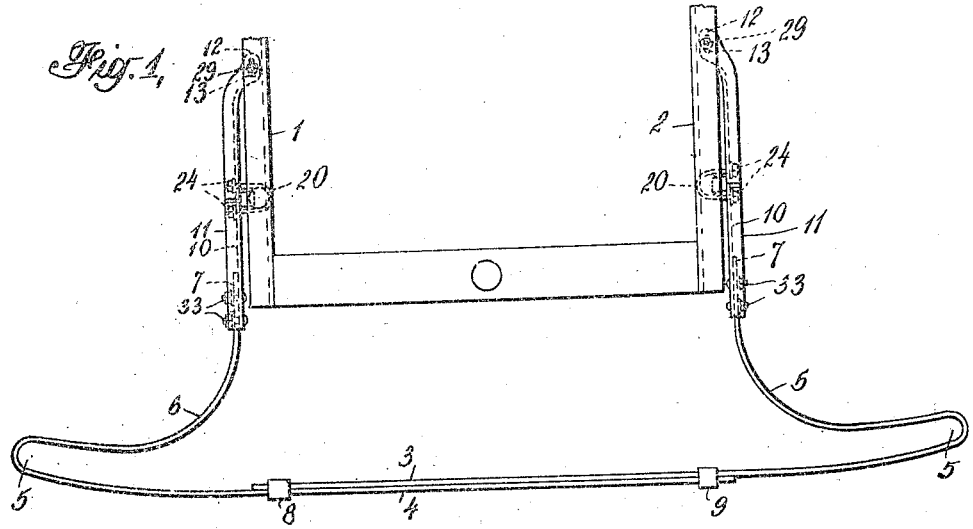
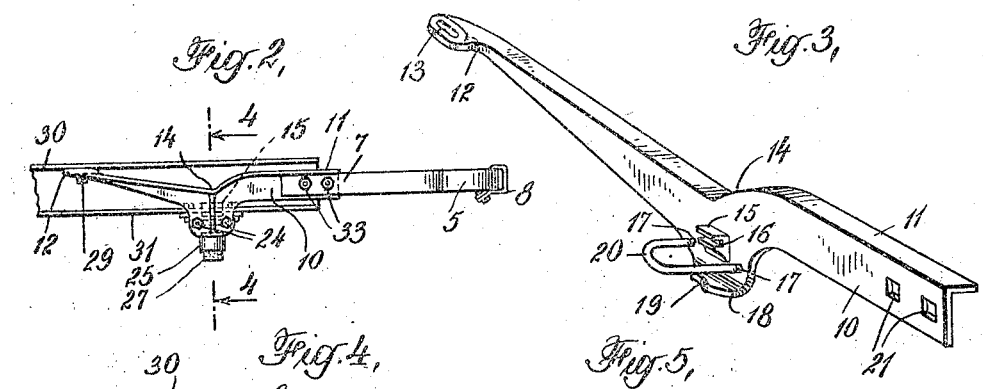
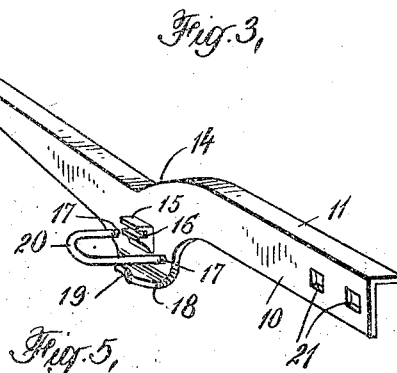
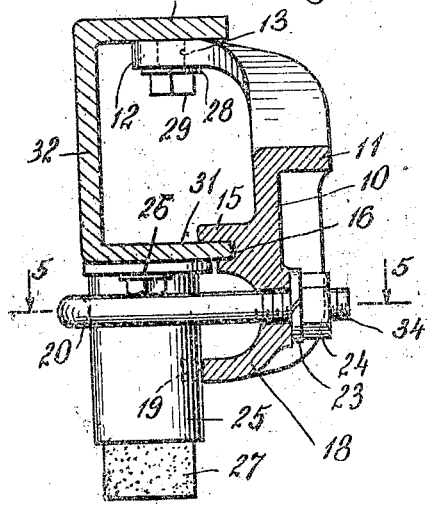
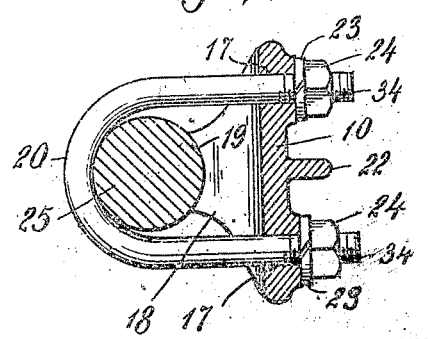
INVENTOR
George Albert Lyon
BY Harry L. Duncan
ATTORNEY.

Patented Dec. 5, 1922.

1,437,600

UNITED STATES PATENT OFFICE.

GEORGE ALBERT LYON, OF PHILADELPHIA, PENNSYLVANIA.

BUFFER-ATTACHING DEVICE.

Application filed July 6, 1922. Serial No. 573,239.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Buffer-Attaching Devices, of which the following is a specification taken in connection with the accompanying drawing.

This invention relates especially to buffer attaching devices adapted to attach Lyon or other type buffers to the front of Overland or generally similar automobiles. The attachment comprises extension supporting brackets which may be formed of malleable iron, drop forgings or other suitable material and the brackets are preferably formed with angular or flanged stiffening portions and with a buffer aligning flange on the front of each bracket against which the edge of the spring strip or other buffer attaching member may be clamped or connected as by one or more connecting bolts passing through these parts. The rear attaching end of the bracket may be slotted to cooperate with an attaching bolt or device secured to the automobile frame member and an intermediate portion of the bracket is preferably provided with definite aligning flanges or members which may engage both above and below one or more of the frame flanges or other portions of the automobile to definitely support or align this part of the bracket which may be clamped in this position as by a U-bolt clamping device.

In the accompanying drawing which shows in a somewhat diagrammatic manner an illustrative embodiment of this invention:

Fig. 1 is a plan view showing the brackets in place and supporting a buffer on an automobile.

Fig. 2 is a side view thereof.

Fig. 3 is an enlarged perspective view of one of these extension brackets.

Fig. 4 is an enlarged transverse section taken substantially along the line 4—4 of Fig. 2, and Fig. 5 is another enlarged sectional detail taken substantially along the line 5—5 of Fig. 4.

For convenience these brackets are shown as supporting a spring strip buffer of the Lyon type on an Overland automobile although of course the device is adapted to be used with other types or styles of buffers or bumpers which preferably have rearwardly extending spring strip or other attaching members. As shown in Figs. 1 and 2, the illustrative buffer may comprise the spring strip attaching members 7, each curving outward at 6 to form the end loops 5 of the buffer from which these spring strips may extend inward into adjustably overlapping or reenforcing position at 3, 4 where the strips may be clamped or connected by the clips or clamping devices 8, 9.

The extension supporting brackets may, as shown in Fig. 3, be formed of malleable iron and may each have adjacent its front end one or more buffer aligning flanges 11, extending laterally from the substantially vertical portion or face 10 of the bracket in which buffer connector portion the square or other apertures 21 may be formed. These apertures may accommodate the square or other noncircular shanks of the connector bolts 33 extending therethrough and through suitable holes in the attaching arms or members 7 of the buffer so as to rigidly and securely connect these parts as shown in Figs. 1 and 2. The intermediate portion of each bracket is preferably securely bolted to the automobile frame or connected portions of the machine and is formed with one or more aligning flanges or members to definitely hold this part of the bracket in the desired vertical position in connection with the cooperating clamping devices. For this purpose a single or duplex aligning flange 15 may be formed on the inner face of the bracket so that the groove or channel 16 thus formed may closely embrace or wedge around the edge of the frame flange 31 which in this type of automobile extends outward on both sides of the machine from the frame web 32, the upper flange 30 also being outwardly bent in a similar way. A lower aligning yoke such as 18 is preferably formed at this part of the bracket so that the curved socket 19 thus provided may partly embrace the depending cushion support 25 in which the rubber or other cushion 27 is mounted for cooperation with the other parts of the automobile. This cushion support or casing 25 may have flanges at its upper portion rigidly bolted as by the bolts 26 to the frame flange so as to provide a good support for this part of the bracket.

This intermediate part of the bracket adjacent these aligning devices is preferably formed with strengthening flanges such as 22 and with holes 17 through which the arms 34 of the U-bolt clamping device 20 extend so that this clamping device can be tightened by the nuts 24 and lock washers 23 around the upper portion of the cushion support or casing and thus strongly and rigidly hold the bracket in the desired aligned position. Of course where this duplex aligning flange cooperates with the lower frame flange the bracket is curved down as at 14 adjacent this point and the rear attaching end of the bracket 12 may, as indicated in Figs. 2, 3 and 4, be upwardly inclined where it is desired to have this attaching end connected to the upper frame flange 30. For this purpose one or more holes or slots such as 13 may be formed in this bracket end and a stud bolt or other attaching device 29 may extend therethrough to securely attach the bracket end to the frame in connection, if desired, with the lock washer 28.

Of course these attaching devices may be most effectively applied by first clamping and connecting the brackets to the frame members and then clamping the somewhat loosely connected buffer strips to each bracket after which the buffer front clips or members may be clamped in their desired adjusted position which is advantageous if excessive strains on the connecting bolts or devices are to be avoided.

This invention has been described in connection with a number of embodiments, forms, proportions, parts, arrangements, materials, methods of connection and use, to the details of which disclosure the invention is not of course to be limited since what is claimed as new and what is desired to be secured by Letters Patent is set forth in the appended claims.

I claim:

1. In automobile buffers, a spring strip buffer having rearwardly extending attaching members and connected end loops, a pair of extension supporting brackets each having adjacent its front end a buffer aligning flange and cooperating connecting bolts extending through the bracket to clamp the buffer attaching member thereto, a duplex aligning flange projecting inward from the intermediate portion of each bracket to grippingly embrace the lower frame flange, a lower aligning yoke having a curved socket to extend around a depending cushion support secured to the automobile frame and a U-bolt clamping device extending around said support adjacent said frame and having its arms extending through the bracket between said aligning flange and said yoke, said bracket having a rear attaching end adapted to be bolted to a flange of the automobile frame.

2. In automobile buffers, a spring strip buffer having rearwardly extending attaching members and connected end loops, a pair of extension supporting brackets each having adjacent its front end connecting bolts extending through the bracket to clamp the buffer attaching member thereto, a duplex aligning flange projecting inward from the intermediate portion of each bracket to engage the lower frame flange, a lower aligning yoke having a curved socket to extend around a depending cushion support secured to the automobile frame and a clamping device engaging said support adjacent said frame, said bracket having a rear attaching end adapted to be bolted to a flange of the automobile frame.

3. In automobile buffers, a buffer having rearwardly extending attaching members, a pair of extension supporting brackets each having adjacent its front end buffer connecting means to clamp the buffer attaching member thereto, an aligning member projecting inward from the intermediate portion of each bracket to grippingly embrace the lower outwardly extending frame flange of the automobile and a clamping device extending through the bracket adjacent said aligning member to secure the bracket to the frame.

4. In automobile buffers, a buffer having rearwardly extending attaching members, a pair of extension supporting brackets each having adjacent its front end buffer connecting means to clamp the buffer attaching member thereto, an aligning member projecting inward from the intermediate portion of each bracket to grippingly engage an outwardly extending portion of the automobile and a clamping device adjacent said aligning member to secure the bracket to the frame.

5. In automobile buffer attaching devices, a pair of extension supporting brackets each having adjacent its front end a buffer aligning device and non-circular connector holes, the intermediate portion of the bracket being formed with a duplex aligning flange adapted to embrace a flange of the automobile frame and being formed with a lower aligning yoke having a curved socket substantially below said aligning flange and a U-bolt clamping device connected to said bracket between said aligning flange and yoke, said bracket being formed with a slotted rear attaching end adapted to be bolted to the upper flange of the frame member.

6. In automobile buffer attaching devices, a pair of extension supporting brackets each having adjacent its front end a buffer aligning device and connector holes, the intermediate portion of the bracket being formed with a duplex aligning flange adapted to embrace a flange of the automobile frame and being formed with a lower aligning yoke having a socket substantially below said aligning flange and a clamping device connected to said bracket between said aligning flange and yoke, said bracket being formed with a rear attaching end adapted to be bolted to the upper flange of the frame member.

7. In automobile buffer attaching devices, a pair of extension supporting brackets each having adjacent its front end buffer connecting means, the intermediate portion of the bracket being formed with an aligning flange adapted to engage a flange of the automobile frame and being formed with a lower aligning yoke having a socket adapted to engage a depending part of the automobile, and a U-bolt clamping device connected to said bracket between said aligning flange and yoke, and adapted to extend around said depending part, said bracket being formed with a rear attaching end adapted to be secured to the automobile frame.

8. In automobile buffer attaching devices, extension supporting brackets each having adjacent its front end buffer connecting means, the intermediate portion of the bracket being formed with an aligning flange adapted to engage the automobile and being formed with a lower aligning yoke adapted to engage a depending part of the automobile and a U-bolt clamping device connected to said bracket and adapted to extend around said depending part, said bracket being formed with a rear attaching end adapted to be secured to the automobile.

9. In automobile buffer attaching devices, extension supporting brackets each having adjacent its front end buffer connecting means, the intermediate portion of the bracket being formed with an aligning flange adapted to engage the automobile and a U-bolt clamping device connected to said bracket and adapted to extend around said depending part.

10. In automobile buffer attaching devices, an extension supporting bracket having adjacent its front end buffer connecting means, the intermediate portion of the bracket being formed with an aligning member adapted to engage a flange of the automobile frame and being formed with a vertically separated aligning portion and a clamping device connected to said bracket adjacent said aligning member.

11. In automobile buffer attaching devices, an extension supporting bracket having adjacent its front end buffer connecting means, the intermediate portion of the bracket being formed with an aligning member adapted to engage the automobile and being formed with a vertically separated aligning portion and a clamping device cooperating with said bracket adjacent said aligning member.

GEORGE ALBERT LYON.